US008548864B2

(12) United States Patent
Bhogal et al.

(10) Patent No.: US 8,548,864 B2
(45) Date of Patent: Oct. 1, 2013

(54) MANAGING TRANSMISSION OF INFORMATION

(75) Inventors: Kulvir S. Bhogal, Pflugerville, TX (US); Michael C. Hollinger, Round Rock, TX (US); Jennifer E. King, Austin, TX (US); Christina K. Lauridsen, Austin, TX (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 12/962,069

(22) Filed: Dec. 7, 2010

(65) Prior Publication Data
US 2012/0143728 A1      Jun. 7, 2012

(51) Int. Cl.
*G06Q 30/00* (2012.01)
(52) U.S. Cl.
USPC ............... 705/26.1; 705/27.1; 705/50; 726/2; 726/26; 713/189
(58) Field of Classification Search
USPC ........ 705/26.1, 27.1, 50; 726/2, 26; 713/189
See application file for complete search history.

(56) References Cited

U.S. PATENT DOCUMENTS 8,065,190 B2 * 11/2011 Collas et al. ................. 705/26.1
8,220,047 B1 * 7/2012 Soghoian et al. ............... 726/22
2002/0116345 A1   8/2002 Harrison
2003/0061111 A1   3/2003 Dutta et al.
2003/0101134 A1 * 5/2003 Liu et al. .......................... 705/39
2005/0027612 A1 * 2/2005 Walker et al. .................... 705/26
2006/0080263 A1   4/2006 Willis et al.
2008/0108324 A1   5/2008 Moshir et al.
2009/0070881 A1 * 3/2009 Yellepeddy et al. ............ 726/26
2009/0100184 A1   4/2009 Chakra et al.
2009/0113006 A1 * 4/2009 McWana ...................... 709/206
2009/0171805 A1 * 7/2009 Gould et al. .................... 705/26
2011/0202968 A1 * 8/2011 Nurmi ............................. 726/1
2012/0143596 A1   6/2012 Bhogal et al.

FOREIGN PATENT DOCUMENTS
WO     2008028286 A1    3/2008

OTHER PUBLICATIONS

"Panda Software Offers Anti-Phishing Tips for 2007," PR Newswire [New York], Jan. 5, 2007.*

(Continued)

*Primary Examiner* — Jeffrey A Smith
*Assistant Examiner* — Anne Georgalas
(74) *Attorney, Agent, or Firm* — Yee & Associates, P.C.; Yeen Tham

(57) ABSTRACT

A method, a computer program product, and an apparatus for managing transmission of information are provided. A determination is made as to whether a pattern in a set of patterns is present in the information to be transmitted by a first user. Responsive to a determination that the pattern in the set of patterns is present in the information to be transmitted, the information is inhibited from being transmitted by the first user. A request is sent to a mobile device of a second user for an approval of the information to be transmitted. Responsive to receiving the approval of the information to be transmitted from the second user, the information is transmitted.

19 Claims, 9 Drawing Sheets

(56) References Cited

OTHER PUBLICATIONS

"How Net Nanny enhances Microsoft Vista's Parental Controls," ContentWatch, Inc., dated Aug. 14, 2009, 1 page. Retrieved Feb. 22, 2013 from http://web.archive.org/web/20090814133036/http://www.netnanny.com/learn_center/vista.

"Phishing Protection | TippingPoint Intrusion Prevention," 3COM Corporation, dated Feb. 26, 2010, 4 pages. Retrieved Feb. 22, 2013 from http://web.archive.org/web/20100226084638/http://www.tippingpoint.com/technology_phishing.html.

"Internet Filter Software Review," TopTenREVIEWS, Inc., dated Jul. 17, 2010, 4 pages. Retrieved Feb. 20, 2013 from web.archive.org/web/20100717051338/http://internet-filter-review.toptenreviews.com/.

* cited by examiner

MANAGING TRANSMISSION OF INFORMATION

BACKGROUND

1. Field

The disclosure relates generally to an improved data processing system and more specifically to transmission of information. More specifically, the disclosure relates to a method, computer program product, and apparatus for managing transmission of information.

2. Description of the Related Art

Data processing systems are often employed by users to conduct transactions on networks, such as the Internet. Such transactions may include making purchases, accessing bank account information, accessing credit card information, and other suitable activities. In many such activities, users request information from information providers. For example, users may visit the website for a bank with which the user has an account to access information about the account. The information may include the balance of the account, recent transactions, and other suitable information.

Prior to accessing the information, users are frequently requested to provide confidential information to the information provider. The information provider may request the confidential information to verify the identity of the user and/or complete a transaction, such as opening a bank account or making an online purchase. The confidential information is data or an identifier known only to the user. The confidential information may include a user name and password, bank account number, credit card number, social security number, or other suitable identifiers. Once the information provider receives the confidential information, the information provider sends the requested information or completes the requested transaction.

Some unauthorized parties attempt to receive confidential information belonging to other users. In the event that the confidential information becomes known to an unauthorized party, the confidential information may be used by the unauthorized parties to perform unauthorized activities on behalf of the user. For example, an unauthorized party may use the credit card number of a user to make a purchase for the benefit of the unauthorized party without the consent of the authorized party.

In some examples, an unauthorized party attempts to receive confidential information by contacting a user and alleging that the unauthorized party is associated with an information provider. For example, an unauthorized party may send an e-mail to a user stating that the unauthorized party is an employee of a bank with which the user has an account. The e-mail may also contain a request for confidential information. For example, the e-mail may state that the bank is updating the records of the bank and that the account of the user may be closed if the user does not provide the social security number of the user.

Some users may recognize the attempt to receive the confidential information by the unauthorized party and discard the communication or report the unauthorized party to the authorities. However, other users may not recognize the attempt to receive the confidential information and trust the allegation that the unauthorized party is associated with the information provider. Thus, some users may send the requested confidential information to the unauthorized party.

SUMMARY

A method, a computer program product, and an apparatus for managing transmission of information are provided. A determination is made as to whether a pattern in a set of patterns is present in the information to be transmitted by a first user. Responsive to a determination that the pattern in the set of patterns is present in the information to be transmitted, the information is inhibited from being transmitted by the first user. A request is sent to a mobile device of a second user for an approval of the information to be transmitted. Responsive to receiving the approval of the information to be transmitted from the second user, the information is transmitted.

DETAILED DESCRIPTION

Figure 1:
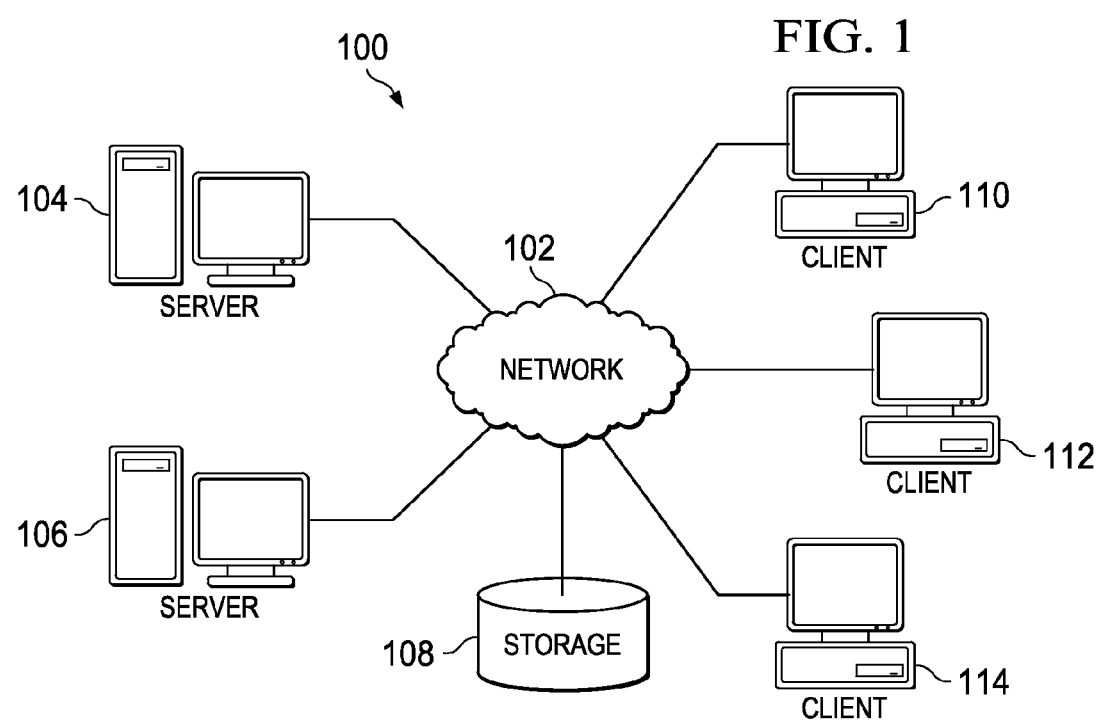
FIG. 1 is a pictorial representation of a network of data processing systems depicted in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments. As used herein, a number of an item means one or more of the item. For example, a number of different types of networks means one or more different types of networks.

Computers in network data processing system 100, such as client computer 110 and/or server computer 104, implement illustrative embodiments to manage transmission of information. Server computer 104 delivers an electronic message to client computer 110 containing a request for confidential information. The user of client computer 110 may trust the electronic message, enter the confidential information in a response, and request that the response be sent.

Responsive to identifying the confidential information in the response, client computer 110 does not transmit the response containing the confidential information. Instead, client computer 110 generates an electronic message to a second user and sends the electronic message to client computer 112. The electronic message contains a request for an approval for the confidential information to be transmitted.

The electronic message is in the form of an e-mail in some illustrative embodiment. Client computer 112 may be a mobile device in some illustrative embodiments.

Client computer 112 receives the electronic message and presents the electronic message to the second user. The second user may input an approval for the confidential information. However, the second user may also input a rejection of the confidential information. In such an illustrative example, the confidential information is deleted and not transmitted. In other illustrative embodiments, input by the second user may cause another request to be generated for the approval and cause the request to be sent to one or more other users. In yet other illustrative examples, the approval may contain a modification of the confidential information to be made prior to transmitting the confidential information, or other suitable activities.

In the event that the second user approves the confidential information, the approval is sent from client computer 112 to client computer 110. Client computer 110 then transmits the confidential information. In this example, client computer 110 transmits the confidential information to server computer 104. Server computer 104 may then deliver the confidential information to the recipient.

When the approval contains a command to modify the confidential information, client computer 110 modifies the confidential information and sends the confidential information to server computer 104. For example, the approval may contain a command to change the confidential information to a substitute value or replace the confidential information with a phrase, such as "redacted." When the rejection is received by client computer 110, the confidential information is not transmitted to server computer 104. In some illustrative embodiments, the response and the confidential information are not transmitted.

Figure 2:
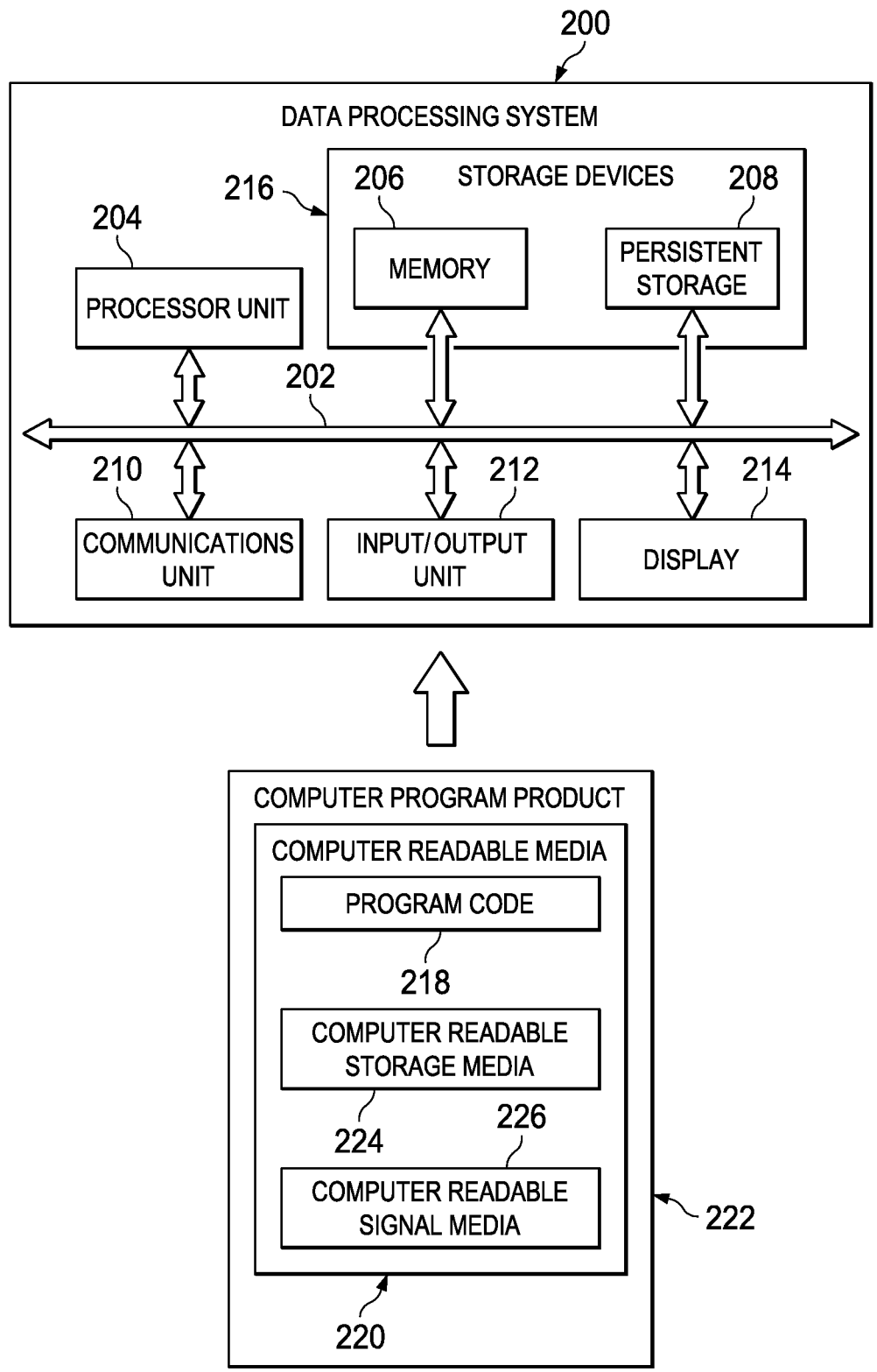
FIG. 2 is a diagram of a data processing system depicted in accordance with an illustrative embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of different considerations. For example, the different illustrative embodiments recognize that some users are more proficient than other users at identifying a fraudulent communication by an unauthorized party that desires to receive confidential information from the user. A user that does not identify that the communication is fraudulent and sent by an unauthorized third party may provide the confidential information requested by the unauthorized party.

The different illustrative embodiments recognize that a user that is not proficient at identifying the fraudulent communication may know a second user that is more proficient at identifying the fraudulent communication than the first user. The different illustrative embodiments determine whether the confidential information is present in a response or other outgoing communication. The confidential information may be identified by being present in a list of patterns of data considered to be confidential data. For example, the patterns of data may be stored in a database.

The different illustrative embodiments prevent the transmission of the confidential information provided by the first user and send a request for an approval to a second user. The confidential information is not sent until the second user responds with the approval to transmit the confidential information and, in some cases, a command to modify the confidential information prior to transmitting the confidential information. In the event that the second user does not respond to the request for the action, a default action may be performed for the confidential information.

Additionally, the different illustrative embodiments recognize and take into account that the second user may desire the help of one or more other users in deciding on the action to be performed on the confidential information. In such illustrative embodiments, a second request for approval may be generated and sent to the one or more other users. The second request for approval may include comments from the second user. In some illustrative embodiments, the action performed on the confidential information is the action identified by the user in the one or more other users who first identifies an action to perform. In other illustrative embodiments, each user in the one or more other users votes for an action and the action with the most votes is performed on the confidential information.

Thus, the different illustrative embodiments provide a method, a computer program product, and an apparatus for managing transmission of information. A determination is made as to whether a pattern in a set of patterns is present in the information to be transmitted by a first user. Responsive to a determination that the pattern in the set of patterns is present in the information to be transmitted, the information is inhibited from being transmitted by the first user. A request is sent to a mobile device of a second user for an approval of the information to be transmitted. Responsive to receiving the approval of the information to be transmitted from the second user, the information is transmitted.

Figure 3:
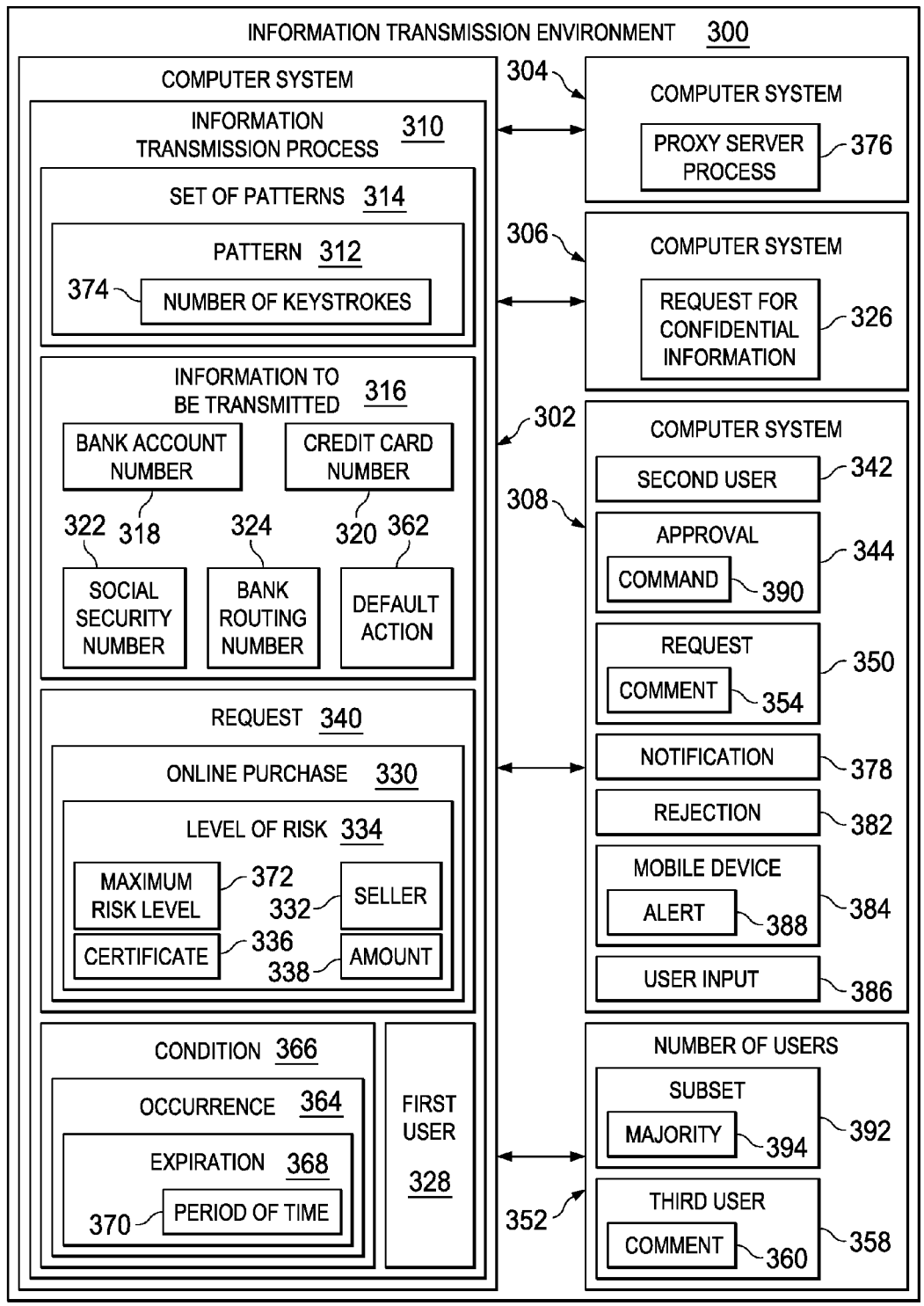
FIG. 3 is an information transmission environment depicted in accordance with an illustrative embodiment.
Figure 4:
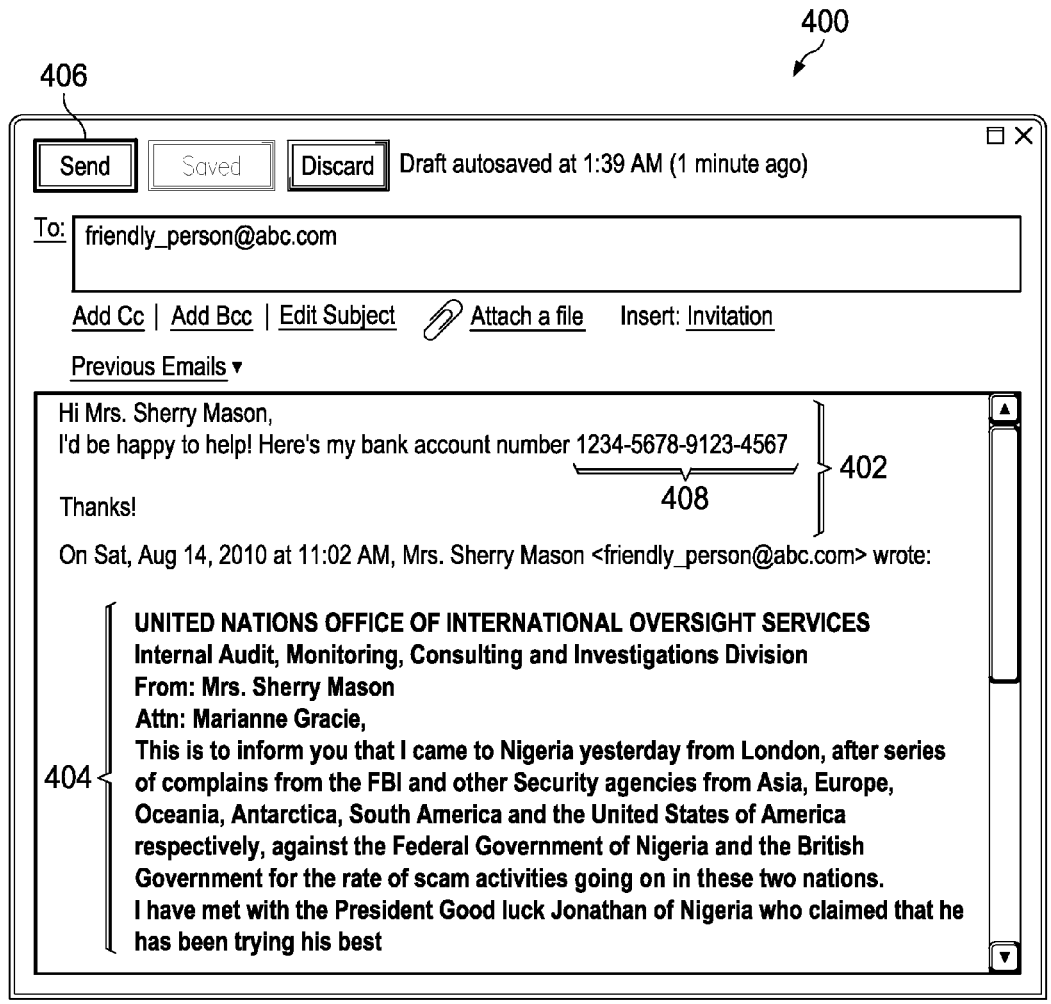
FIG. 4 is an illustration of a graphical user interface for information to be transmitted depicted in accordance with an illustrative embodiment.

Looking now to FIG. 3, an information transmission environment is depicted in accordance with an illustrative embodiment. Information transmission environment 300 is an example of an environment in which illustrative embodiments may be implemented. Computer systems 302, 304, 306, and 308 are example implementations of data processing system 200 in FIG. 2.

Computer system 302 runs information transmission process 310. Prior to sending an electronic communication from computer system 302, information transmission process 310 determines whether pattern 312 in set of patterns 314 is present in information to be transmitted 316. Pattern 312 is a collection of text that consists of confidential information. For example, pattern 312 may consist of bank account number 318, credit card number 320, social security number 322, bank routing number 324, or another suitable collection of text.

Information transmission process 310 determines whether pattern 312 is present in information to be transmitted 316 by identifying number of keystrokes 374. Number of keystrokes 374 are one or more keys on a keyboard activated by first user 328. Thus, information transmission process 310 may identify pattern 312 in any process running on computer system 302. In other illustrative embodiments, outbound communications for computer system 302 are transmitted to computer system 304 for processing by proxy server process 376 instead of the intended recipient of the outbound communications.

In yet other illustrative embodiments, information transmission process 310 determines whether pattern 312 is present in information to be transmitted 316 by identifying the contents of form fields submitted in a web browser or in an operating system. For example, information transmission process 310 may identify pattern 312 by identifying the contents of an outgoing message field in a web-based e-mail system. Information transmission process 310 may also determine whether pattern 312 is present in information to be transmitted 316 by identifying words in the contents of the form fields. For example, the words in the contents of the form fields may include "Social Security number" or "card number."

In some illustrative embodiments, information transmission process 310 does not inhibit sending information to be transmitted 316 because information to be transmitted 316 is sent to proxy server process 376 and not computer system 306. In such illustrative embodiments, proxy server process 376 determines whether pattern 312 is present in information to be transmitted 316. Proxy server process 376 may run information transmission process 310 instead of computer system 302 in such illustrative embodiments.

Set of patterns 314 is a listing of patterns entered by a user in some illustrative embodiments. In other illustrative embodiments, set of patterns 314 may consist of all patterns that fit particular formatting criteria. For example, set of patterns 314 may consist of all patterns of 16 numbers, where every four numbers is separated by a hyphen. In other words, set of patterns 314 may consist of all patterns of the form "XXXX-XXXX-XXXX-XXXX," where each X presents a number. In this illustrative example, set of patterns 314 consists of patterns that have the formatting criteria of credit card number 320.

Information to be transmitted 316 is data that has been entered by first user 328 for transmission to another computer system. For example, information to be transmitted 316 may be a response to request for confidential information 326 received from computer system 306. Request for confidential information 326 may be an e-mail from an unauthorized party attempting to fraudulently receive confidential information from first user 328. Request for confidential information 326 may be a website under the control of an unauthorized party that requests confidential information from first user 328 and alleges to be an authorized user for such confidential information. For example, the website may be controlled by an unauthorized party but has a design similar to the design of the website for a bank with which first user 328 has an account.

Of course, information to be transmitted 316 may consist of information in a form other than e-mail. For example, information to be transmitted 316 may be information to perform online purchase 330. Online purchase 330 is a transaction in which first user 328 desires to purchase goods or services by providing confidential information for the purposes of arranging payment for online purchase 330. In such an illustrative embodiment, request for confidential information 326 may be sent by an authorized representative of seller 332 for online purchase 330.

In illustrative embodiments in which information to be transmitted 316 is to perform online purchase 330, information transmission process 310 may identify level of risk 334 associated with online purchase 330. Level of risk 334 is an assessment of the potential for confidential information in information to be transmitted 316 to be received by an unauthorized party. Level of risk 334 is based on identity of seller 332, certificate 336 for seller 332, and amount 338 of online purchase 330.

In illustrative embodiments in which level of risk 334 is based on certificate 336, the validity, expiration, and a trust level for the domain with which certificate 336 is associated may affect level of risk 334. For example, level of risk 334 may be higher when certificate 336 is expired. Additionally, level of risk 334 may be based on whether certificate 336 is issued to the domain to which information to be transmitted 316 is being submitted. Level of risk 334 may also be based on the protocol used to submit information to be transmitted 316. For example, secure hypertext transfer protocol (HTTPS) has a lower level of risk 334 than hypertext transfer protocol (HTTP) because secure hypertext transfer protocol is encrypted. Of course, in other illustrative embodiments, different or additional factors may be used in identifying level of risk 334.

In illustrative embodiments in which information to be transmitted 316 is input for an e-mail and/or a website, information transmission process 310 determines whether pattern 312 is present in information to be transmitted 316. When information transmission process 310 determines that pattern 312 is present in information to be transmitted 316, information transmission process 310 does not send information to be transmitted 316. In some illustrative embodiments, information transmission process 310 inhibits information to be transmitted 316 from being sent.

Information transmission process 310 then generates request 340 and sends request 340 to computer system 308 for second user 342. Request 340 is a communication that provides second user 342 with data about information to be transmitted 316 and requests that second user 342 provide approval 344. In some illustrative embodiments, request 340 contains a copy of request for confidential information 326 and information to be transmitted 316. In illustrative embodiments in which information to be transmitted 316 is for online purchase 330, information transmission process 310 may generate request 340 when level of risk 334 is greater than maximum risk level 372. Maximum risk level 372 may be a predetermined value for risk of online purchase 330 based on identity of seller 332, certificate 336 of seller 332, amount 338 of online purchase 330, or other suitable factors. In illustrative embodiments in which proxy server process 376 receives information to be transmitted 316, proxy server process 376 may generate request 340 and receive approval 344.

Approval 344 is the consent of second user 342 for information to be transmitted 316. Second user 342 receives request 340 and decides whether to send approval 344 based on the trustworthiness of request for confidential information 326 and information to be transmitted 316. Second user 342 may select approval 344 within request 340. Approval 344 is sent to information transmission process 310. In these illustrative examples, request 340 is in the form of an e-mail, and approval 344 is selected by activating a button or link for the desired action.

In some illustrative embodiments, computer system 308 is mobile device 384. Mobile device 384 is a cell phone in some illustrative embodiments. In such embodiments, request 340 may be sent using a short message service (SMS) text message, an electronic mail, an instant message, or another suitable message type. Second user 342 may be made aware of request 340 by receiving and/or presenting alert 388. Alert 388 may be in the form of a text message alert, an electronic mail alert, a push notification alert, or another suitable notification alert.

In illustrative embodiments in which proxy server process 376 sends request 340, proxy server process 376 may receive information to be transmitted 316 as input in a web-based form. Proxy server process 376 may then generate request 340 using the input in the web-based form. For example, proxy server process 376 may receive a web-based form from computer system 302 containing fields including first name, last name, address, credit card number, security code, and other suitable fields. The web-based form may be submitted for delivery to computer system 306. In such an illustrative example, proxy server process 376 generates request 340 that contains the name of each field with the content of the particular field.

In one illustrative embodiment, the name used for the field is the name of the field submitted in a HTTP POST request received from computer system 302. For example, computer system 302 may submit a web-based form using an HTTP POST request in which the fields "firstname", "lastname", and "creditcard" are contained in the HTTP POST request. Information is also submitted for each field. Proxy server process 376 then generates request 340 containing the field names and the content of the particular field. Request 340 is then sent to computer system 308. In one illustrative embodiment, proxy server process 376 sends request 340 to computer system 308 by sending request 340 over a network, such as the Internet, to an SMS gateway server. The SMS gateway server then sends request 340 as an SMS message to computer system 308.

Approval 344 is then selected by receiving user input 386 from second user 342. User input 386 may be in the form of a button, switch, touch, or another suitable input method. Approval 344 may then be sent to information transmission process 310.

In yet other illustrative embodiments, command 390 is included in approval 344. Command 390 is a directive to information transmission process 310 to modify information to be transmitted 316 prior to transmitting information to be transmitted 316. Command 390 may include replacement content for information to be transmitted 316, a message to be inserted within information to be transmitted 316, or another suitable action. When command 390 is received with approval 344 by information transmission process 310, information transmission process 310 modifies information to be transmitted 316 and then sends information to be transmitted 316 to computer system 306.

Of course, second user 342 may not desire to send approval 344 when request for confidential information 326 is believed by second user 342 to be fraudulent. In such illustrative embodiments, second user 342 may send rejection 382 instead of approval 344. Rejection 382 is a negative response to request 340. In other words, rejection 382 is a lack of consent for information to be transmitted 316 by second user 342. Rejection 382 is sent to information transmission process 310 when selected by second user 342. Information transmission process 310 then deletes and/or discards information to be transmitted 316.

In some illustrative embodiments, second user 342 may desire to involve other users in deciding on approval 344. In such embodiments, second user 342 selects user input 386 for generating request 350. Request 350 is a copy of request 340; however, request 350 is sent to number of users 352. In some illustrative embodiments, request 350 is generated by computer system 308. In other illustrative embodiments, a directive for generating request 350 is returned to information transmission process 310, and information transmission process 310 generates request 350.

Number of users 352 consists of one or more users with which second user 342 desires to involve in deciding on approval 344. Request 350 may also include comment 354. Comment 354 is a textual statement by second user 342. Comment 354 may consist of an explanation or a question relating to information to be transmitted 316 and/or request for confidential information 326.

Number of users 352 receives request 350. Number of users 352 may then select approval 344. In some illustrative embodiments, the selection of the user in number of users 352 first in time to select approval 344 or rejection 382 is returned to information transmission process 310. In other illustrative embodiments, number of users 352 may vote on approval 344. The selection with the most votes may be returned to information transmission process 310 as approval 344, approval with command 390, or rejection 382. In other words, approval 344, approval with command 390, and/or rejection 382 may be received from subset 392 of number of users 352. The response for which subset 392 is majority 394 of number of users 352 is sent to information transmission process 310.

Prior to approval 344 or rejection 382 being returned to information transmission process 310, third user 358 in number of users 352 may submit comment 360. Comment 360 is a statement or question like comment 354. Comment 360 may be sent to number of users 352 and second user 342. Once approval 344 or rejection 382 is returned to information transmission process 310, information transmission process 310 performs action 356 on information to be transmitted 316.

In some illustrative embodiments, information transmission process 310 performs default action 362 on information to be transmitted 316 upon occurrence 364 of condition 366. Condition 366 may be expiration 368 of period of time 370 or notification 378 in these examples. Expiration 368 of period of time 370 occurs when period of time 370 elapses and neither approval 344 nor rejection 382 are received by information transmission process 310. Notification 378 is a statement by second user 342 that second user 342 is unavailable to select approval 344 or rejection 382.

Default action 362 may consist of, for example, transmitting information to be transmitted 316, deleting information to be transmitted 316, modifying information to be transmitted 316 and then transmitting information to be transmitted 316, or another suitable action. In some illustrative embodiments, default action 362 may also be sending request 340 to third user 358 or number of users 352. Default action 362 may also consist of sending request 340 to each user in a prioritized list of users until action 344 is received.

The illustration of computer system 302 in information transmission environment 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, information transmission process 310 may generate request 340 and send request 340 to number of users 352 without sending request 340 to second user 342. Additionally, each of computer system 302, computer system 304, computer system 306, and computer system 308 may be mobile devices, such as mobile phones, in some illustrative embodiments. Additionally, in some illustrative embodiments, request for confidential information 326 is not received. Instead, information to be transmitted 316 is not requested by an unauthorized party. For example, first user 328 may inadvertently enter pattern 312 in an application other than the intended application.

Looking now to FIGS. 4-7, an example of information to be transmitted and requests for an approval are depicted in accordance with an illustrative embodiment. With specificity to FIG. 4, an illustration of a graphical user interface for information to be transmitted is depicted in accordance with an illustrative embodiment. Information to be transmitted 400 is an example implementation of information to be transmitted 316 in FIG. 3.

Information to be transmitted 400 is an e-mail in this illustrative example. Content 402 is in information to be transmitted 400. Content 402 is a message typed by a user to an unauthorized party containing confidential information 408 for the user. Content 402 is included in information to be transmitted 400. In this illustrative example, confidential information 408 is a bank account number in this illustrative example. Information to be transmitted 400 also contains text 404. Text 404 is a partial quote of the message from the unauthorized party that requested the confidential information. In this illustrative example, the unauthorized party alleged an association with the United Nations.

The user may activate send button 406 to send the message. An information transmission process, such as information transmission process 310 in FIG. 3, may inhibit the sending of information to be transmitted 400 and generate a request, such as request 340 in FIG. 3.

Figure 5:
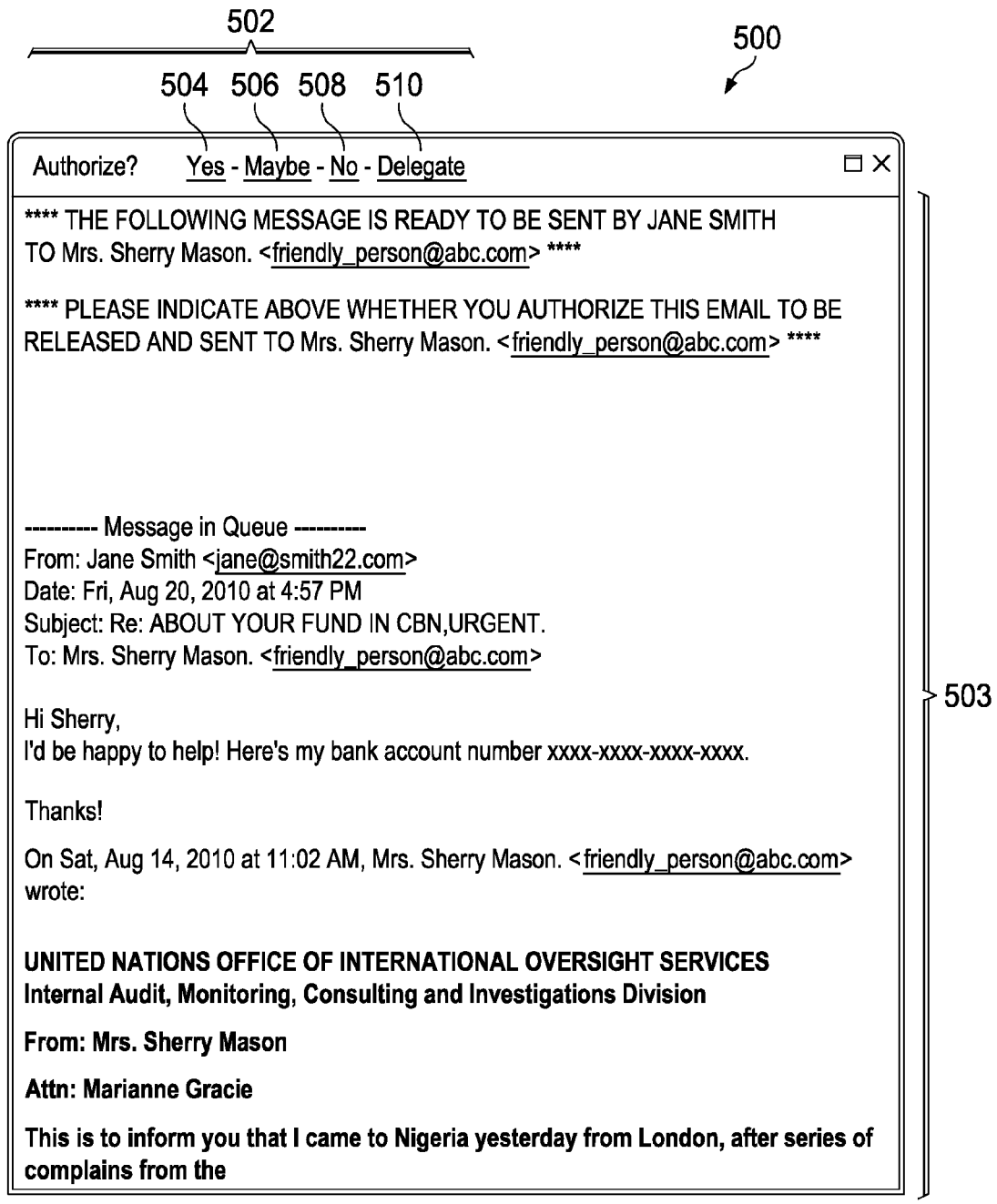
FIG. 5 is an illustration of a graphical user interface for a request depicted in accordance with an illustrative embodiment.

Turning now to FIG. 5, an illustration of a graphical user interface for a request is depicted in accordance with an illustrative embodiment. Request 500 is an example implementation of request 340 in FIG. 3.

Request 500 includes options 502 and content 503. In this illustrative example, request 500 is an e-mail. Content 503 includes information about information to be transmitted 400 in FIG. 4. For example, content 503 includes the content of the information to be transmitted, as well as the recipient e-mail address. Options 502 give the user a list of possible actions. In this illustrative example, options 502 consist of option 504 to approve and send the information to be transmitted, option 506 to not select an action at this time, option 508 to reject and delete the information to be transmitted, and option 510 to generate a request to a number of users to request an approval from the number of users. In this illustrative example, the user selects option 510, as shown in FIG. 6.

Figure 6:
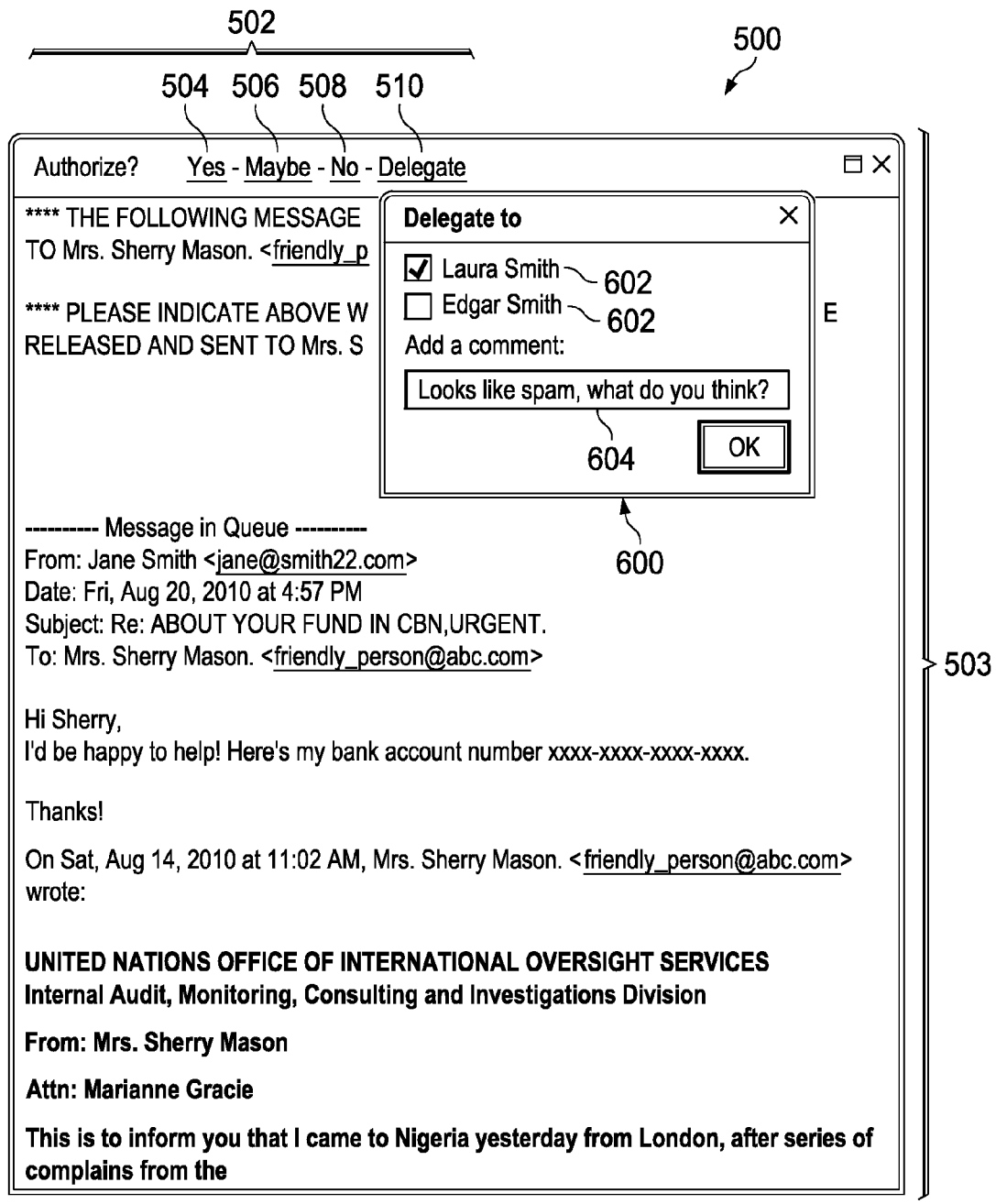
FIG. 6 is an additional illustration of a request depicted in accordance with an illustrative embodiment.

Looking now to FIG. 6, an additional illustration of a request is depicted in accordance with an illustrative embodiment. In this illustrative example, the user selected option 510. In response to selecting option 510, the user interface presents box 600. Box 600 presents number of users 602 and comment field 604. Number of users 602 is an example implementation of number of users 352 in FIG. 3. Comment field 604 provides an area for the user to enter a comment, such as comment 354 in FIG. 3. The user selects the users to which a request, such as request 350 in FIG. 3, is to be sent.

Figure 7:
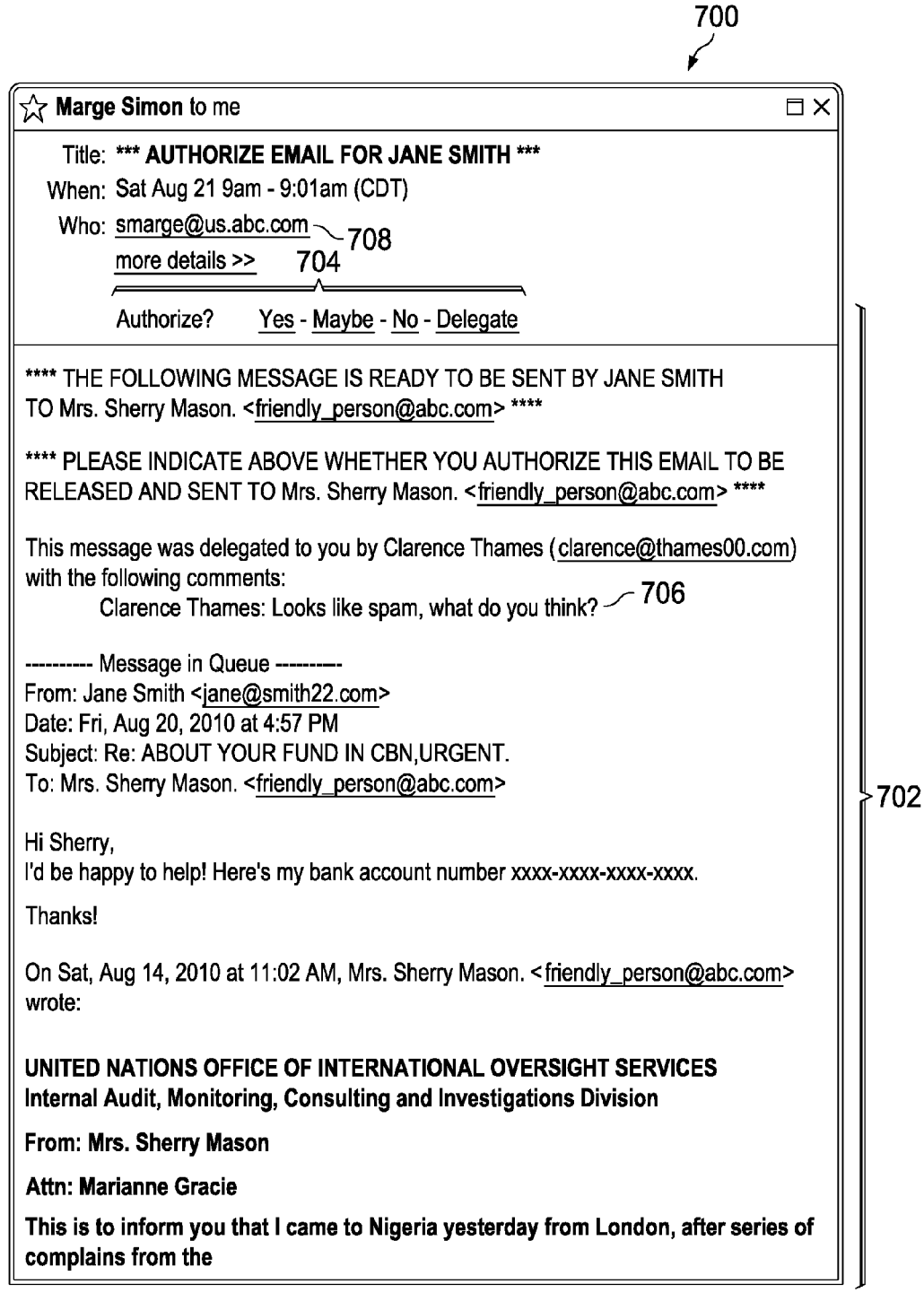
FIG. 7 is yet another illustration of a request depicted in accordance with an illustrative embodiment.

With specificity to FIG. 7, yet another illustration of a request is depicted in accordance with an illustrative embodiment. Request 700 is an example implementation of request 350 in FIG. 3.

Request 700 is received by user 708. User 708 was selected in number of users 602 in FIG. 6. Request 700 contains content 702. Content 702 includes the information shown in content 503 about the information to be transmitted. Content 702 also includes comment 706 entered in comment field 604 in FIG. 6. Request 700 also includes options 704. Options 704 are the same options presented as options 502 in FIG. 5. However, options 704 are presented to user 708 because a second user, such as second user 342 in FIG. 3, selected an action to generate request 700 for user 708 to select an action using options 704. In this illustrative embodiment, user 708 may select the response. However, in other illustrative embodiments, user 708 would enter a vote for an action, and the action with the most votes would be performed by the information transmission process.

Figure 8:
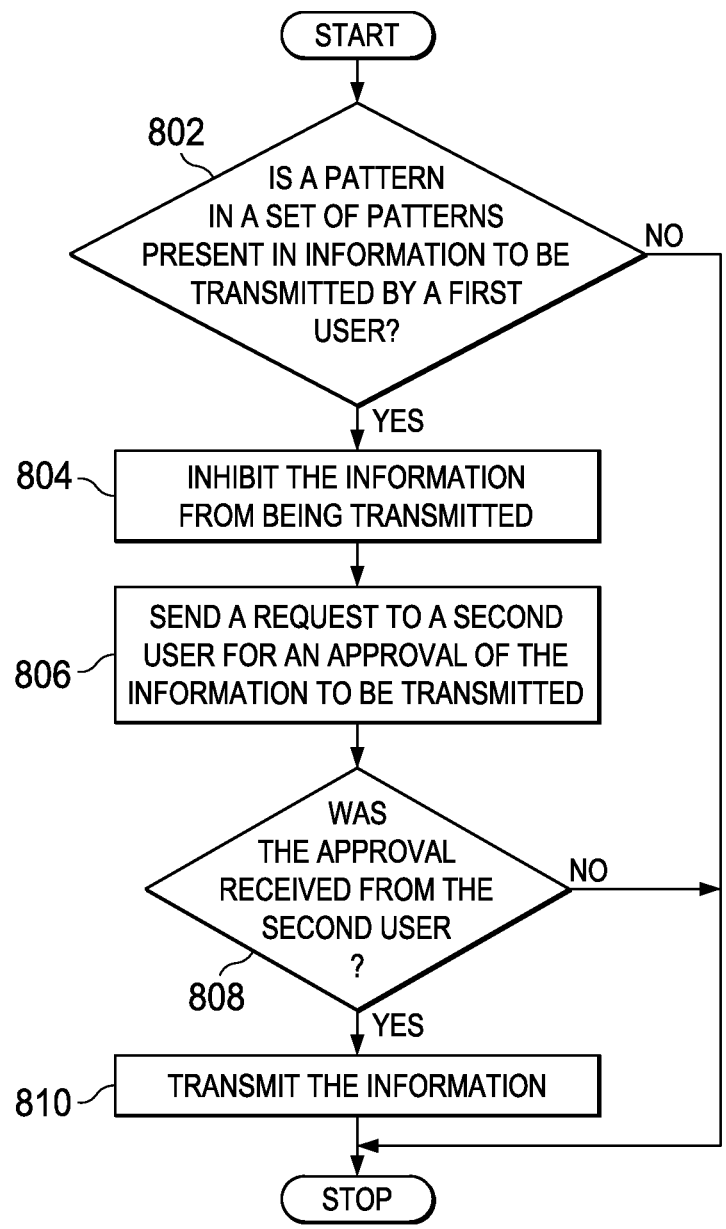
FIG. 8 is a flowchart of a process for managing transmission of information depicted in accordance with an illustrative embodiment.

Turning now to FIG. 8, a flowchart of a process for managing transmission of information is depicted in accordance with an illustrative embodiment. The process may be performed by information transmission process 310 running in computer system 302 in FIG. 3.

The process begins by determining whether a pattern in a set of patterns is present in information to be transmitted by a first user (step 802). If at step 802 the process determines that a pattern in a set of patterns is not present in information to be transmitted by a first user, the process terminates. If at step 802 the process determines that the pattern in the set of patterns is present in information to be transmitted by a first user, the process inhibits the information from being transmitted (step 804). The process may inhibit the information from being transmitted by storing the information in a queue or another suitable storage area. The process does not transmit the information at step 804. The process then sends a request to a second user for an approval of the information to be transmitted (step 806). The process sends the request to a mobile device of the second user in this illustrative example. The process then determines whether the approval was received from the second user (step 808). If the process determines that the approval was received from the second user at step 808, the process transmits the information (step 810). The process terminates thereafter. If the process determines at step 808 that the approval was not received from the second user, the process terminates.

Figure 9:
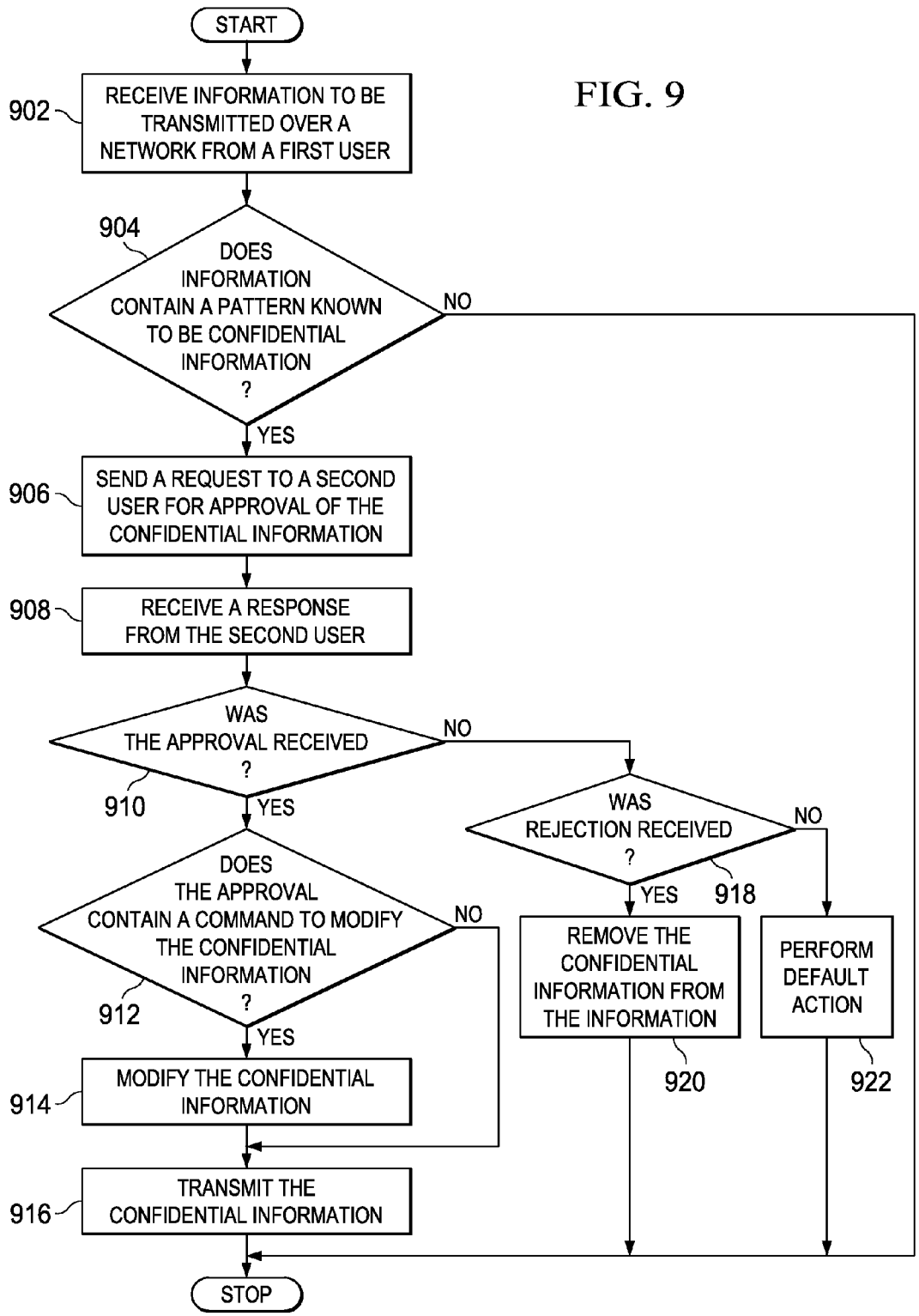
FIG. 9 is an additional flowchart of a process for managing transmission of information depicted in accordance with an illustrative embodiment.

Looking now to FIG. 9, an additional flowchart of a process for managing transmission of information is depicted in accordance with an illustrative embodiment. The process may be performed by information transmission process 310 running in computer system 302 in FIG. 3.

The process begins by receiving information to be transmitted over a network from a first user (step 902). The process then determines whether the information contains a pattern known to be confidential information (step 904). If at step 904 the process determines the information does not contain a pattern known to be confidential information, the process terminates. If at step 904 the process determines the information contains a pattern known to be confidential, the process sends a request to a second user for an approval of the confidential information (step 906). The process receives a response from the second user (step 908).

The process then determines if the approval was received (step 910). If at step 910 the process determines the approval was received, the process determines whether the approval contains a command to modify the confidential information (step 912). If the process determines that the approval contains a command to modify the confidential information at step 912, the process modifies the confidential information (step 914). The process then proceeds to step 916. If the process determines that the command to modify the confidential information was not received at step 912, the process transmits the confidential information (step 916).

If the process determines that the approval was not received at step 910, the process determines whether the rejection was received (step 918). If the process determines that the rejection was received at step 918, the process removes the confidential information from the information (step 920). The process terminates thereafter. If the process determines that the rejection was not received at step 918, the process performs a default action (step 922). In some illustrative embodiments, the default action is performed when a condition has been met. For example, the condition may be that a period of time has expired or a response that the second user is unavailable may have been received. The process terminates thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). For example, one or more of the blocks may be implemented as program code, in hardware, or a combination of the program code and hardware.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output, or I/O devices (including but not limited to keyboards, displays, pointing devices, etc.), can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing transmission of information, the method comprising:

responsive to a computer receiving a request for confidential information from a requesting data processing system, determining, by the computer, whether a pattern of confidential information in a set of confidential information patterns is present in a response to be transmitted from the computer to the requesting data processing system, wherein the computer is associated with a first user;

responsive to the computer determining that the pattern of confidential information in the set of confidential information patterns is present in the response to be transmitted from the computer to the requesting data processing system, inhibiting, by the computer, the response from being transmitted;

sending, by the computer, a request to a mobile device of a second user for an approval of the pattern of confidential information to be transmitted in the response;

responsive to the computer receiving from the second user the approval of the pattern of confidential information to be transmitted in the response, transmitting, by the computer, the response with the pattern of confidential information to the requesting data processing system; and responsive to the computer receiving from the second user a rejection of the pattern of confidential information to be transmitted in the response, removing, by the computer, the pattern of confidential information from the response and transmitting the response without the pattern of confidential information to the requesting data processing system.

2. The method of claim 1, wherein the sending, by the computer, the request to the mobile device of the second user for the approval of the pattern of confidential information to be transmitted in the response further comprises:

generating, by the computer, an alert for the mobile device of the second user;

sending, by the computer, the alert to the mobile device of the second user; and receiving, by the computer, a user input inputted on the mobile device of the second user, wherein the user input is selected from one of an approval input or a rejection input.

3. The method of claim 2, wherein the alert for the mobile device is selected from a text message, a push notification, and an electronic mail.

4. The method of claim 1, wherein the request is a first request, and further comprising:

after sending the first request to the mobile device of the second user for the approval of the pattern of confidential information to be transmitted in the response, sending, by the computer, a second request for the approval of the pattern of confidential information to be transmitted in the response to a number of users in response to the computer receiving a user input from the mobile device of the second user requesting the approval from the number of users.

5. The method of claim 4 further comprising:

receiving, by the computer, the approval of the pattern of confidential information to be transmitted in the response from each of a subset of the number of users;

determining, by the computer, whether the subset of the number of users is a majority of the number of users; and responsive to the computer determining that the subset of the number of users is the majority, sending, by the computer, the approval of the pattern of confidential information to be transmitted in the response from the second user to an information transmission process of the computer that transmits the response with the pattern of confidential information to the requesting data processing system.

6. The method of claim 5 further comprising:

receiving, by the computer, a comment from a third user in the number of users; and transmitting, by the computer, the comment from the third user to the second user and the number of users.

7. The method of claim 4, wherein the second request comprises a comment from the second user.

8. The method of claim 1 further comprising:

responsive to an occurrence of a condition, performing, by the computer, a default action on the pattern of confidential information to be transmitted in the response.

9. The method of claim 8, wherein the condition is selected from a group comprising an expiration of a period of time and a notification from the second user that the second user is unavailable.

10. The method of claim 1, wherein the pattern of confidential information to be transmitted in the response is selected from a credit card number, a bank account number, a social security number, and a bank routing number.

11. The method of claim 1, wherein the determining, by the computer, whether the pattern of confidential information in the set of confidential information patterns is present in the response to be transmitted from the computer to the requesting data processing system further comprises:

determining, by the computer, whether the pattern of confidential information is present in a number of keystrokes by the first user.

12. The method of claim 1, wherein the determining, by the computer, whether the pattern of confidential information in the set of confidential information patterns is present in the response to be transmitted from the computer to the requesting data processing system further comprises:

sending, by the computer, the response to a proxy server; and determining, by the proxy server, whether the pattern of confidential information is present in the response.

13. The method of claim 1, wherein the approval comprises a command to modify the pattern of confidential information and then transmit the modified pattern of confidential information to the requesting data processing system.

14. The method of claim 1, wherein the pattern of confidential information to be transmitted in the response is to perform an online purchase, and wherein the determining, by the computer, whether the pattern of confidential information in the set of confidential information patterns is present in the response to be transmitted from the computer of the first user to the requesting data processing system further comprises:

identifying, by the computer, a level of risk associated with the online purchase that is greater than a predetermined risk value.

15. The method of claim 14, wherein the level of risk is based on a protocol used to transmit the response.

16. A computer readable storage medium having program code embodied thereon that when executed by a computer cause the computer to perform a method for managing transmission of information, comprising:

responsive to receiving a request for confidential information from a requesting data processing system, determining whether a pattern of confidential information in a set of confidential information patterns is present in a response to be transmitted from the computer to the requesting data processing system, wherein the computer is associated with a first user;

responsive to determining that the pattern of confidential information in the set of confidential information patterns is present in the response to be transmitted from the computer to the requesting data processing system, inhibiting the response from being transmitted;

sending a request to a mobile device of a second user for an approval of the pattern of confidential information to be transmitted in the response;

responsive to receiving from the second user the approval of the pattern of confidential information to be transmitted in the response, transmitting the response with the pattern of confidential information to the requesting data processing system; and responsive to receiving from the second user a rejection of the pattern of confidential information to be transmitted in the response, removing the pattern of confidential information from the response and transmitting the response without the pattern of confidential information to the requesting data processing system.

17. The computer readable storage medium of claim 16, further comprising:

responsive to an occurrence of a condition, performing a default action on the pattern of confidential information to be transmitted in the response.

18. A computer system for managing transmission of information, the computer system comprising:

a bus system;

a storage device connected to the bus system, wherein the storage device stores program code; and a processor unit connected to the bus system, wherein the processing unit executes the program code to determine whether a pattern of confidential information in a set of confidential information patterns is present in a response to be transmitted from the computer system to a requesting data processing system in response to receiving a request for confidential information from the requesting data processing system, wherein the computer system is associated with a first user; inhibit the response from being transmitted in response to determining that the pattern of confidential information in the set of confidential information patterns is present in the response to be transmitted from the computer system to the requesting data processing system; send a request to a mobile device of a second user for an approval of the pattern of confidential information to be transmitted in the response; transmit the response with the pattern of confidential information to the requesting data processing system in response to receiving from the second user the approval of the pattern of confidential information to be transmitted in the response; and remove the pattern of confidential information from the response and transmit the response without the pattern of confidential information to the requesting data processing system in response to receiving from the second user a rejection of the pattern of confidential information to be transmitted in the response.

19. The computer system of claim 18, wherein the processing unit further executes the program code to perform a default action on the pattern of confidential information to be transmitted in the response in response to an occurrence of a condition.

* * * * *